US012544292B2

(12) United States Patent
Guenther

(10) Patent No.: US 12,544,292 B2
(45) Date of Patent: Feb. 10, 2026

(54) STRETCHING APPARATUS FOR SELF STRETCHING MUSCLES OF A USER'S BODY

(71) Applicant: Gregg M Guenther, Chandler, AZ (US)

(72) Inventor: Gregg M Guenther, Chandler, AZ (US)

( * ) Notice: Subject to any disclaimer, the term of this patent is extended or adjusted under 35 U.S.C. 154(b) by 0 days.

(21) Appl. No.: 19/223,448

(22) Filed: May 30, 2025

(65) Prior Publication Data

US 2025/0312224 A1 Oct. 9, 2025

Related U.S. Application Data

(63) Continuation of application No. 17/310,986, filed on Sep. 3, 2021, now abandoned.

(51) Int. Cl.
*A61H 1/02* (2006.01)

(52) U.S. Cl.
CPC ......... *A61H 1/0237* (2013.01); *A61H 1/0292* (2013.01); *A61H 2201/0107* (2013.01); *A61H 2201/0142* (2013.01); *A61H 2201/1207* (2013.01); *A61H 2201/1654* (2013.01); *A61H 2201/1676* (2013.01); *A61H 2201/5035* (2013.01); *A61H 2201/5038* (2013.01); *A61H 2203/0406* (2013.01); *A61H 2203/0425* (2013.01); *A61H 2203/0456* (2013.01)

(58) Field of Classification Search
CPC ...... A61H 1/02; A61H 1/0237; A61H 1/0244; A61H 1/0292; A61H 2201/1676
See application file for complete search history.

(56) References Cited

U.S. PATENT DOCUMENTS 3,005,633 A * 10/1961 Riemer ................ A61G 13/009 601/24
3,623,480 A * 11/1971 Chisolm .................. A61H 1/02 601/26
3,661,149 A 5/1972 Ferries
3,674,017 A 7/1972 Stefani, Jr.
(Continued)

OTHER PUBLICATIONS

English translation of DE 202006000813 U1 (Year: 2006).*
English translation of Kim (KR 20120078023 A) (Year: 2012).*

*Primary Examiner* — Tu A Vo
*Assistant Examiner* — Christopher E Miller
(74) *Attorney, Agent, or Firm* — Carson Patents; Gregory D Carson

(57) ABSTRACT

The present invention is a stretching apparatus enabling a user to independently stretch back, leg, and abdominal muscles without assistance. The device includes a rigid modular frame with a detachable base, a pivotable panel assembly with padded arms, and a motorized actuator. The actuator adjusts the angle of the panel under user control via a remote or integrated interface. The apparatus supports multiple user orientations and stretch types through reconfiguration of the panel and frame. Ergonomic padded supports enhance comfort, and the modular design allows for transport, storage, and adaptation across clinical, athletic, and home environments. Programmable features and locking mechanisms enable precision, safety, and repeatable stretching routines. The invention provides a versatile, self-operated system for rehabilitation, fitness, and flexibility training.

10 Claims, 4 Drawing Sheets

(56) References Cited

U.S. PATENT DOCUMENTS

| | | | | | |
|---|---|---|---|---|---|
| 4,097,037 | A | * | 6/1978 | Tardiff | A61G 13/009 5/617 |
| 4,723,537 | A | | 2/1988 | Parker, Jr. | |
| 4,834,072 | A | * | 5/1989 | Goodman | A61H 1/0244 5/619 |
| 5,033,457 | A | | 7/1991 | Bonutti | |
| 5,626,547 | A | | 5/1997 | Davies, III et al. | |
| 5,728,048 | A | * | 3/1998 | Hirschfeld | A61H 1/0292 601/24 |
| 5,906,564 | A | | 5/1999 | Jacobsen | |
| 5,913,758 | A | | 6/1999 | Nunez | |
| 5,951,448 | A | | 9/1999 | Bolland | |
| 6,758,825 | B1 | | 7/2004 | Mathew | |
| 7,604,583 | B2 | | 10/2009 | Denisco | |
| 7,946,971 | B2 | | 5/2011 | Conley et al. | |
| 7,998,039 | B1 | * | 8/2011 | Wallach | A63B 23/0233 482/121 |
| 10,682,542 | B2 | | 6/2020 | Thorpe | |
| 10,688,335 | B1 | | 6/2020 | Maher | |
| 2002/0151419 | A1 | | 10/2002 | Barnes et al. | |
| 2008/0032877 | A1 | * | 2/2008 | Denisco | A61H 1/0244 482/145 |
| 2013/0090216 | A1 | | 4/2013 | Jackson | |
| 2014/0187389 | A1 | | 7/2014 | Berg | |
| 2017/0259109 | A1 | * | 9/2017 | McJames, II | A63B 22/0015 |
| 2018/0117388 | A1 | * | 5/2018 | Porter | A63B 21/00069 |

* cited by examiner

STRETCHING APPARATUS FOR SELF STRETCHING MUSCLES OF A USER'S BODY

CROSS-REFERENCE TO RELATED APPLICATIONS

This application claims benefit to the earlier filing date and right of priority under 35 U.S.C. § 120 to patent application Ser. No. 17/310,986, titled Stretching Machine, filed 3 Sep. 2021 by Gregg M. Guenther the contents of which are herein incorporated by reference under 37 CFR 1.57 (b).

BACKGROUND OF THE INVENTION

Technical Field

This invention relates generally to a stretching apparatus. This invention relates more particularly to an apparatus for enabling a user to perform self-directed muscle stretching exercises without the assistance of another person.

This invention relates generally to apparatuses and devices for facilitating controlled muscle extension and therapeutic flexibility training. This method also can be used with rehabilitation protocols, athletic training programs, and physical therapy regimens. This invention relates more particularly to a user-operated stretching machine to independently target and elongate back, leg, and abdominal muscles.

The field of art to which this invention pertains includes exercise and physical therapy equipment, particularly machines classified under systems and methods for body stretching and range-of-motion improvement. The invention falls within the U.S. Patent Classification definitions of subject matter that includes exercise devices configured to manipulate or assist the body in stretching or flexibility improvement, including adjustable, motorized, or modular structures enabling user control. It also pertains to systems designed to provide guided stretching forces through mechanical or powered means without requiring external human intervention.

BACKGROUND ART

Various stretching machines and exercise devices are known in the art for improving flexibility, alleviating muscular tension, and assisting with physical therapy. These devices include leg split machines, inversion tables, back extension benches, and cable-driven systems. Many of these systems allow users to stretch particular muscle groups; however, they frequently require manual effort, limited adjustability, or assistance from a partner or trainer.

Devices such as manual leg stretchers often utilize crank or lever mechanisms to spread the legs apart in a seated position. These are typically focused on the hip adductors and hamstrings and offer minimal versatility for other muscle groups. In many cases, such machines are limited in their adjustability and lack ergonomic features for user comfort. Furthermore, these machines are often designed for a single purpose and do not accommodate the varied needs of rehabilitation, athletic conditioning, and general flexibility improvement.

Other systems, such as inversion tables and spinal traction devices, are intended for decompression of the spine and back stretching. While effective in specific applications, they generally rely on gravity or passive positioning rather than user-controlled actuation. Additionally, these systems may lack modularity, are often bulky, and are not easily adaptable for other forms of muscle stretching.

While some powered or motor-assisted stretching machines exist, they are often designed for limited clinical use, are bulky, and do not offer the flexibility to target multiple muscle groups or adapt to various body types and use scenarios. These systems may also lack portability, user-friendly control systems, or fail to support a full range of rehabilitation and athletic training needs.

In light of the foregoing prior art, there is a need for a self-operated, user-controlled stretching apparatus to better provide comprehensive, adjustable, and comfortable stretching of multiple muscle groups without external assistance.

BRIEF SUMMARY OF THE INVENTION

The present invention provides a user-operated stretching apparatus configured to allow individuals to independently perform targeted stretching exercises without the need for a physical therapist, partner, or external force. The invention is designed to support the stretching of major muscle groups including the back, legs, and abdominals, through a reconfigurable apparatus that incorporates motorized control and ergonomic support components.

The inventive concept lies in the integration of a modular frame structure with a pivotable, padded panel assembly that can be repositioned by a user-controlled powered actuator. This configuration enables precise, repeatable stretching angles and self-directed muscle elongation, addressing a limitation in prior systems which typically require manual force or lack adjustability across multiple muscle regions.

The object of the invention is to facilitate a more comprehensive, comfortable, and accessible stretching experience that can be adapted for fitness, rehabilitation, and therapeutic applications. The apparatus eliminates the dependency on others for deep or assisted stretches, enabling independent users to achieve consistent results with improved safety and convenience.

An advantage of the present invention is its ability to provide controlled and customizable stretching for multiple muscle groups, using a single, compact machine operable by the user alone. The system is further enhanced by modular and detachable frame components, making it suitable for clinical and home environments alike.

According to a first aspect of the invention, there is a stretching apparatus for enabling a user to independently stretch at least one of a back muscle group, a leg muscle group, and an abdominal muscle group without the assistance of another person, comprising all features of the primary stretching apparatus including a modular frame, a pivotable panel assembly with padded arms, a powered actuator, and a user-operated control device.

Further features of the invention are disclosed in dependent claims as follows: According to a second aspect of the present invention, there is a stretching apparatus in the form of a self-directed stretching machine for enabling ergonomic and programmable control of stretch angles. An advantage of the self-directed stretching machine is its ability to maintain safe and effective stretching positions with minimal physical strain or repositioning by the user.

According to a third aspect of the present invention, there is a stretching apparatus in the form of a modular therapeutic device for enabling transportability and multi-configuration stretching exercises. An advantage of the modular therapeutic device is its adaptability to different body types, therapeutic goals, and physical environments without requiring permanent installation.

According to a fourth aspect of the present invention, there is a stretching apparatus in the form of a powered flexibility training machine for enabling remote or real-time control of a pivotable support structure. An advantage of the powered flexibility training machine is its ability to provide incremental, user-controlled tension adjustments for more precise and comfortable stretching.

According to a fifth aspect of the present invention, there is a stretching apparatus in the form of a reconfigurable exercise platform for enabling the stretching of multiple muscle groups using a single pivotable interface. An advantage of the reconfigurable exercise platform is the efficient use of space and functional versatility without the need for multiple specialized machines.

In summary, the advantages of the present invention include autonomous operation, powered user control, multi-angle adjustability, a pivotable and padded support interface, and a modular frame design. These features collectively overcome limitations in prior art by enabling self-directed stretching routines that are safer, more effective, and suitable for a broad range of users and environments.

The invention will now be described, by way of example only, with reference to the accompanying drawings in which:

DETAILED DESCRIPTION OF THE INVENTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Throughout this specification, the word "comprise," or variations thereof such as "comprises" or "comprising," will be understood to imply the inclusion of a stated element, integer or step, or group of elements integers or steps, but not the exclusion of any other element, integer or step, or group of elements, integers or steps.

Index of Labelled Features in Figures. Features are listed in numeric order by Figure in numeric order.

Figure 1:
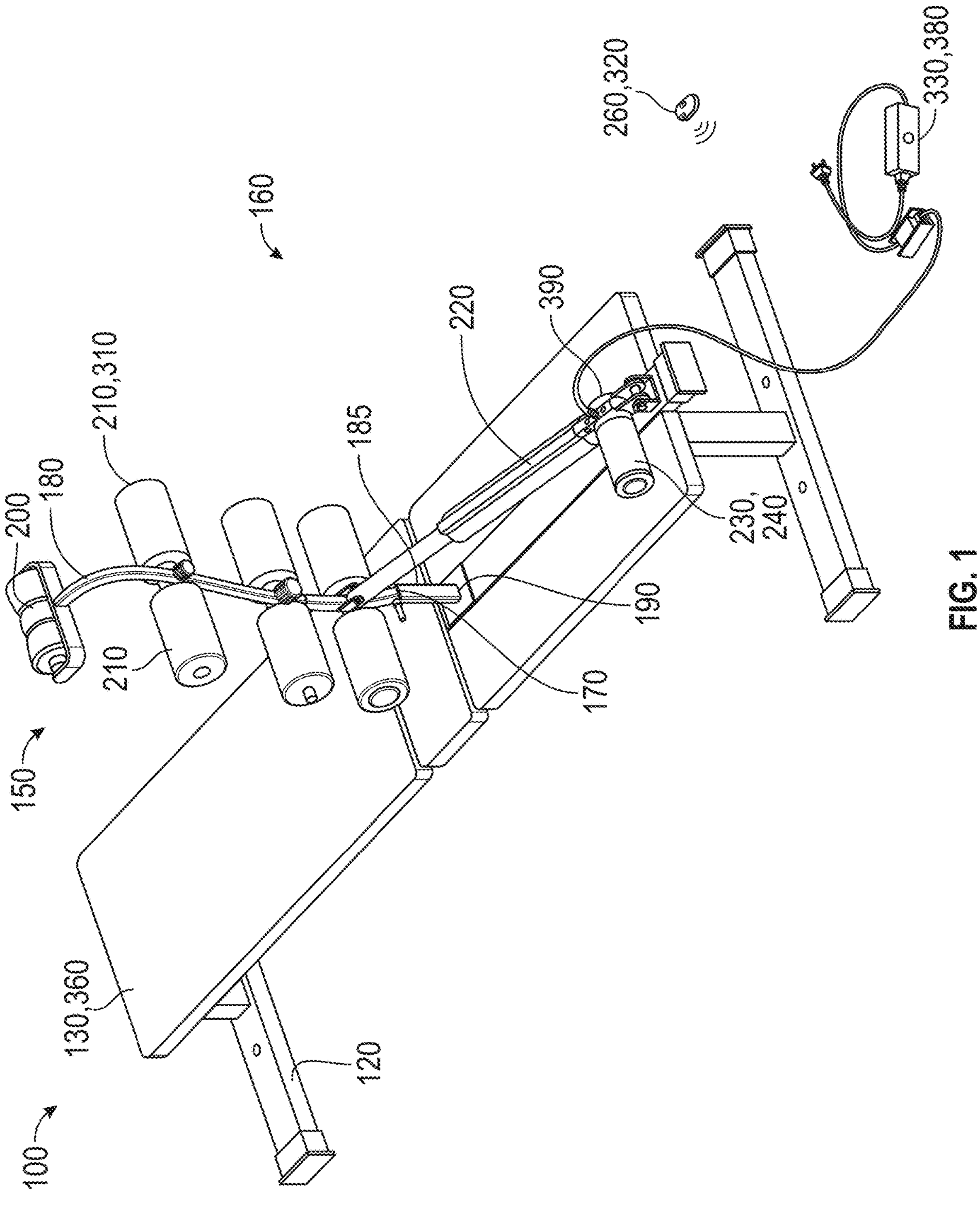
FIG. 1 shows a perspective view of the stretching apparatus for self stretching muscles of a user's body showing the base extended and the power actuated mechanical pushing apparatus at its ninety degree movement position according to the invention.
Figure 2:
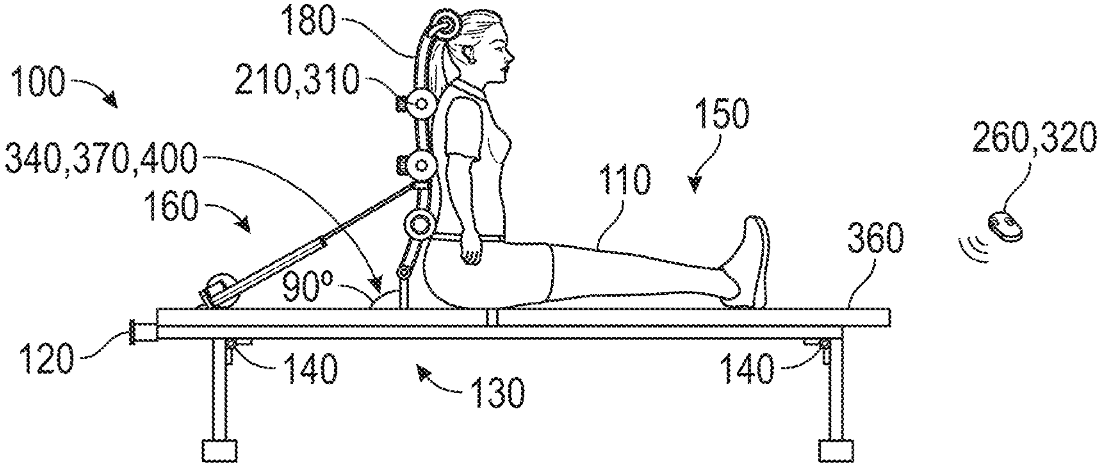
FIG. 2 shows a side view of the stretching apparatus for self stretching muscles of a user's body in use showing a seated user stretching their lower back and leg muscles from a seated position according to the invention.
Figure 3A:
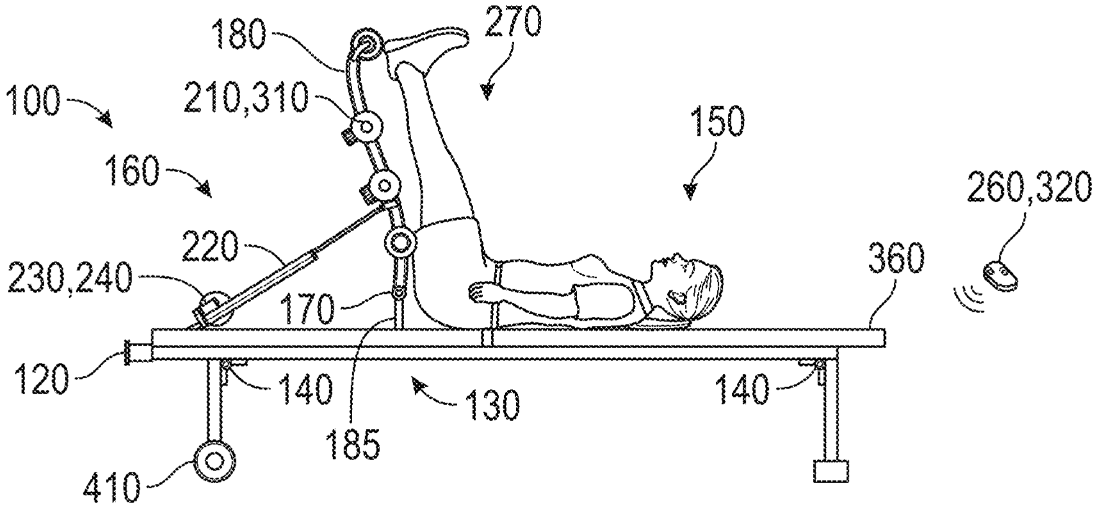
FIG. 3A shows a side view of the stretching apparatus for self stretching muscles of a user's body in use showing a supine user stretching their lower back and leg muscles from a supine position according to the invention.
Figure 3B:
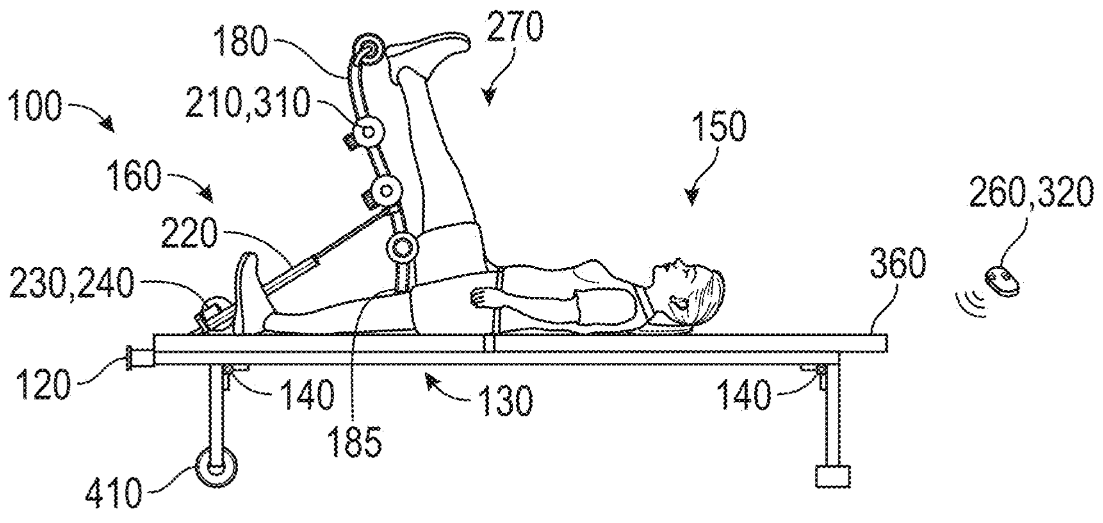
FIG. 3B shows a side view of the stretching apparatus for self stretching muscles of a user's body in use showing a supine user stretching their lower back and leg muscles of one leg from a supine position according to the invention.
Figure 4:
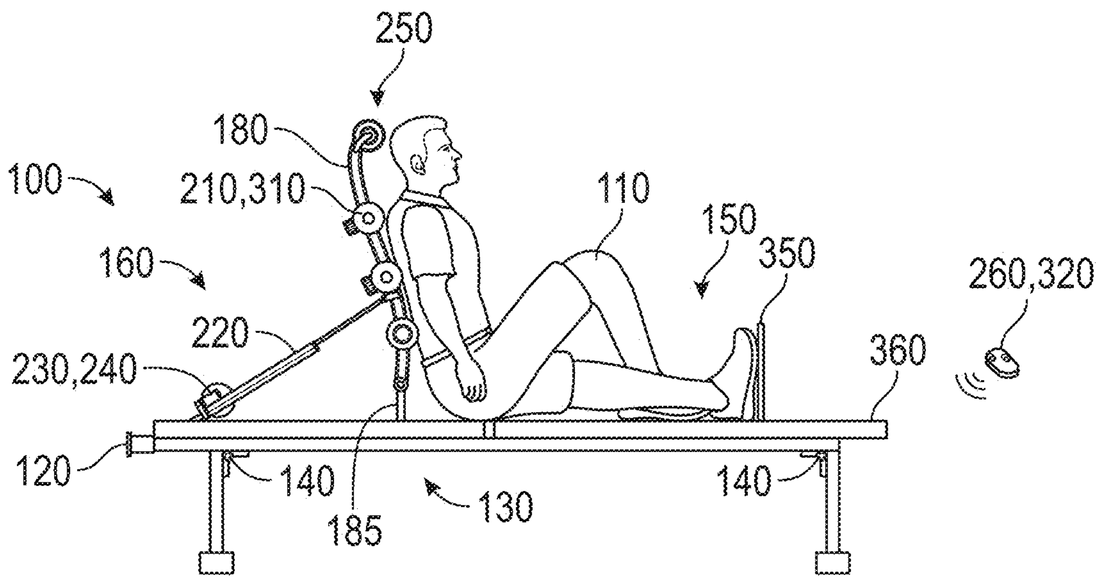
FIG. 4 shows a side view of the stretching apparatus for self stretching muscles of a user's body in use showing a seated user with their right leg crossed over the left stretching their lower back and leg muscles from a seated position according to the invention.
Figure 5:
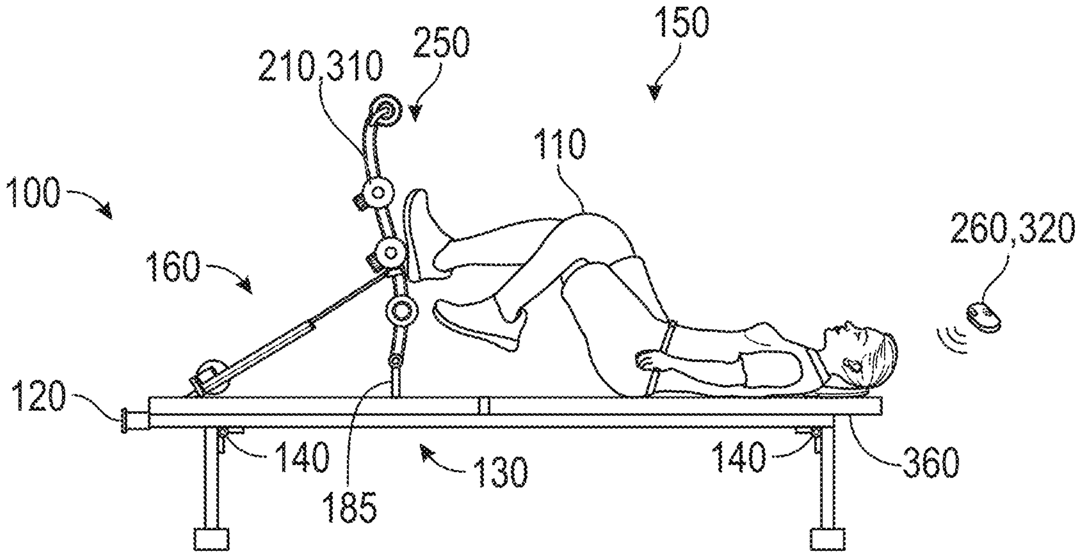
FIG. 5 shows a side view of the stretching apparatus for self stretching muscles of a user's body in use showing a supine user with their right leg crossed over the left stretching their lower back and leg muscles from a supine position according to the invention.
Figure 6:
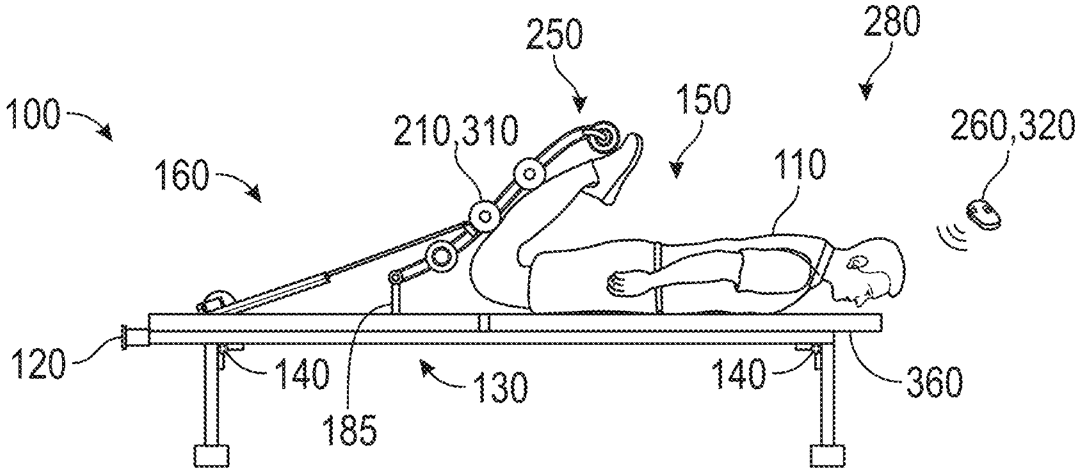
FIG. 6 shows a side view of the stretching apparatus for self stretching muscles of a user's body in use showing a prone user stretching their lower back and leg muscles from a prone position using the power actuated mechanical pushing apparatus well beyond the ninety degree movement position according to the invention.

Referring to the Figures, there is shown in FIGS. 1, 2, 3A, 3B, 4, 5, and 6 the following features:

Element 100 which is a stretching apparatus.
Element 110 which is a user.
Element 120 which is a rigid modular frame.
Element 130 which is a main frame portion.
Element 140 which is a detachable base portion.
Element 150 which is a user application side.
Element 160 which is a push anchor side.
Element 170 which is a pivotable panel assembly.
Element 180 which is a riser bar.
Element 185 which is a riser bar lifter.
Element 190 which is a distal end.
Element 200 which is a free end.
Element 210 which is a padded arm.
Element 220 which is a power actuator.
Element 230 which is a motor.
Element 240 which is a drive mechanism.
Element 250 which is a position of said pivotable panel assembly.
Element 260 which is a user-operated control device.
Element 270 which is an extension of said pivotable panel assembly.
Element 280 which is a retraction of said pivotable panel assembly.
Element 310 which is a foam-filled or gel-filled arm.
Element 320 which is a handheld remote control.
Element 330 which is an integrated control panel.
Element 340 which is a stretch angle.
Element 350 which is a stabilizing foot or mount.
Element 360 which is a rectangular extension frame.
Element 370 which is an angular travel range.
Element 380 which is a programmable interface.
Element 390 which is a position-locking mechanism.
Element 400 which is a selected angular position.
Element 410 which is a transport wheel.

The present invention is a self-operated stretching apparatus designed for individual use without requiring assistance from a second person. The apparatus enables the user to stretch back, leg, and abdominal muscle groups through the controlled adjustment of a pivotable panel assembly that is actuated by a user-controlled powered mechanism. The apparatus is configured for use in home, clinical, or athletic training environments.

To construct the stretching apparatus, a rigid modular frame is fabricated from durable lightweight materials such as aluminum, reinforced steel, or composite tubing. The modular frame comprises a main frame portion and a detachable base portion. The main frame includes vertical and horizontal support members that define a stable structure with a user application side and a push anchor side. The detachable base is joined to the main frame using quick-release locking pins or threaded couplers that allow for easy removal without tools.

A pivotable panel assembly is affixed to the user application side of the frame. The panel assembly consists of a riser bar made of metal tubing or composite material, having a distal end pivotally mounted to the frame via a hinge or rotational coupling and a free end extending outward. Orthogonally attached to the riser bar are two padded arms, which are positioned laterally to engage and support the user's back, legs, or abdomen, depending on the mode of operation. The padded arms are constructed using high-density foam or gel inserts encased in a synthetic leather or fabric covering to ensure comfort and hygienic use.

The free end of the riser bar is operatively connected to an actuator mechanism. The actuator may be an electric linear actuator, motorized screw drive, or hydraulic piston assembly, selected based on load-bearing requirements and stroke length necessary to achieve effective stretch angles. The actuator is mounted between the frame's push anchor side and the pivotable panel assembly. The actuator's retracting and extending motions cause the panel to pivot about its hinge point, adjusting the angle of the padded arms relative to the user.

The actuator is coupled to a user-operated control device. This control device may include a handheld remote with wired or wireless connectivity, a panel-mounted switch interface, or a programmable controller with digital display. The controller allows the user to initiate, pause, or reverse the actuator motion. Optional features include preset angle selection, timers, or programmable stretch sequences. The control device is configured for intuitive operation and can be mounted on the frame or held by the user during stretching.

In use, the user positions their body relative to the frame, such that the padded arms of the pivotable panel contact the targeted muscle group. For leg stretching, the user may be seated with their legs extended and supported by the arms; for back or abdominal stretching, the user may recline or stand and lean against the panel. Once in position, the user activates the control device to cause the actuator to move the panel, thereby applying controlled stretch force.

The apparatus supports multiple stretching modes by altering the configuration or user orientation. For example, with the panel at a low angle and the user seated, hamstring and calf muscles can be targeted. With the panel raised and the user leaning backward against it, lumbar or abdominal muscles can be elongated. The modular frame permits reconfiguration by adding or removing a rectangular extension frame, which is pivotably connected to the main frame and swings in the same plane as the pivotable panel to provide additional reach or support.

The detachable base provides elevation and stability during use. It may incorporate anti-skid feet or locking casters to prevent unintended movement. When disassembled, the frame and base components can be packed for transport or storage, enabling use in portable or multipurpose environments.

Additional features may include a locking mechanism to hold the panel in a fixed position for isometric holds, interchangeable padded arms for different body sizes or stretch types, and measurement markings to track user progress. The system may also be integrated with a smartphone app or digital interface for therapy tracking.

The apparatus is assembled by securing the frame components, attaching the actuator and pivotable panel, connecting the control interface, and verifying alignment and operational integrity. Users are instructed to adjust the positioning to their comfort level and to operate the controls slowly to prevent overstretching. The design permits a high degree of adjustability, safety, and effectiveness for stretching routines targeting diverse muscle groups.

Various configurations and options are available for the stretching apparatus described herein to optimize performance, user comfort, and applicability across different use cases. These options may include variations in frame geometry, actuation systems, padding structures, and interface methods.

The frame of the apparatus may be offered in different sizes or made adjustable to accommodate users of varying heights and body types. Telescoping or slotted joints may be incorporated into the vertical or horizontal frame members, allowing users or clinicians to modify the frame dimensions to optimize ergonomic alignment. Materials such as aircraft-grade aluminum or carbon-reinforced composites may be used to reduce weight without compromising structural strength.

The actuator can be selected based on desired force output, speed, and noise level. In clinical settings, a low-noise electric linear actuator may be preferred for a quiet therapeutic environment. In athletic or home use scenarios, a higher-speed actuator with programmable acceleration/deceleration curves may enhance responsiveness. An internal limit switch and overload protection can be integrated for user safety.

The pivotable panel assembly may feature interchangeable padded arm units, which can be swapped out based on the target muscle group or user preference. For instance, contoured pads may be used for back support, while flatter pads may suit leg extensions. These arms may also be angle-adjustable to change the contact surface orientation.

Control options may include a touchscreen interface with Bluetooth or Wi-Fi connectivity, allowing integration with mobile applications. A mobile app may offer stretch tracking, progress visualization, and remote customization of preset stretch routines. In basic configurations, a wired hand remote with up/down buttons may be used for simplicity and cost control.

The detachable base may be configured with adjustable-height legs or vibration-dampening materials to enhance user comfort and accommodate uneven floors. For mobile use, the apparatus may be configured with collapsible or foldable frame segments, enabling compact storage in vehicles or clinic cabinets.

Optional accessories may include shoulder harnesses or foot straps to stabilize the user's position during aggressive stretching angles. Visual guides or mirrors may be integrated to assist users in aligning their body during setup. Indicators such as LED markers or angle sensors may be added for feedback on stretch progress.

In group fitness or therapeutic settings, multiple units may be designed to nest or connect in parallel for space efficiency. The apparatus may be offered with color-coded or user-personalized components for gyms, rehabilitation centers, or specialized sports teams.

The present invention offers significant advantages over conventional stretching equipment by delivering an integrated, user-controlled, and modular solution for independent stretching. One primary benefit is the autonomy it offers users, eliminating the need for a partner or therapist during stretching sessions. This is particularly advantageous for users engaging in home therapy, solo workouts, or remote rehabilitation programs.

The use of powered actuation introduces greater precision, consistency, and safety in stretching routines. Users can achieve specific angles of stretch and apply consistent force over time, reducing the risk of overexertion or injury. The ability to lock the pivotable panel at predetermined positions allows for sustained isometric holds, which are often used in therapy and athletic conditioning.

The modular and reconfigurable nature of the apparatus provides versatility, allowing one device to serve multiple stretching functions. This reduces the need for multiple single-function machines and provides cost savings and space efficiency for facilities and individuals.

The ergonomic design of the padded arms and user interface enhances comfort, making the device suitable for users with limited mobility, post-surgical recovery needs, or high-performance training goals. Customizable features further adapt the machine to user-specific therapeutic regimens.

The invention also introduces transportability and storage options through its detachable and collapsible components, making it ideal for mobile therapists, athletic trainers, and users with limited space.

Altogether, the GMG-P3CIP stretching apparatus addresses unmet needs in the fields of physical therapy, rehabilitation, and fitness by combining adjustability, safety, comfort, and independence into a single multifunctional device.

In a preferred embodiment of the present invention there is a stretching apparatus for enabling a user to independently stretch at least one of a back muscle group, a leg muscle group, and an abdominal muscle group without the assistance of another person. The apparatus includes a rigid modular frame comprising a main frame portion and a detachable base portion, a pivotable panel assembly having a riser bar with a distal end and a free end, and a plurality of padded arms extending orthogonally from the riser bar. The distal end is pivotally mounted to the frame's user application side, while the free end is connected to a powered actuator. The powered actuator, controlled by a user-operated device, adjusts the angular position of the panel to deliver self-directed stretching. The apparatus is configurable into at least two operational modes to stretch different muscle groups based on the orientation of the pivotable panel.

In an alternate embodiment of the present invention there is a stretching apparatus in which the plurality of padded arms comprises two foam- or gel-filled arms. These arms are positioned laterally with respect to one another to symmetrically distribute force across the user's body, enhancing comfort and reducing pressure points during stretching routines.

In an alternate embodiment of the present invention there is a stretching apparatus in which the powered actuator is motor-driven. The user-operated control device includes a handheld remote control or an integrated control panel with directional input, allowing real-time adjustment of the stretching angle. This configuration enables responsive and user-friendly operation during exercise.

In an alternate embodiment of the present invention there is a stretching apparatus in which the detachable base portion is configured for tool-free removal and includes stabilizing feet or floor-engaging mounts. These features ensure operational stability during use and facilitate transport or compact storage of the apparatus.

In an alternate embodiment of the present invention there is a stretching apparatus further comprising a rectangular extension frame. This frame is pivotably connected to the main frame and swings in the same plane as the pivotable panel assembly. It extends the reach or changes the contact angle to accommodate different user positions or stretching goals.

In an alternate embodiment of the present invention there is a stretching apparatus in which the pivotable panel assembly operates through an angular travel range of at least from zero degrees to ninety degrees. This range supports varied stretching postures and adapts to different levels of user flexibility.

In an alternate embodiment of the present invention there is a stretching apparatus in which the user-operated control device includes a programmable interface. The interface allows users to configure target stretch angles, session duration, or preloaded sequences for progressive stretching protocols.

In an alternate embodiment of the present invention there is a stretching apparatus in which the pivotable panel assembly is configured to support stretching in standing, seated, or supine orientations. This versatility enhances usability across different physical therapy and fitness contexts.

In an alternate embodiment of the present invention there is a stretching apparatus comprising a position-locking mechanism. This mechanism secures the pivotable panel assembly at a selected angle, enabling sustained static or isometric stretches.

In an alternate embodiment of the present invention there is a stretching apparatus including transport wheels and a frame design suitable for both home and clinical use. This configuration supports portability, versatility, and ease of deployment across varied environments.

In a preferred embodiment of the present invention there is a stretching apparatus for enabling a user to independently stretch at least one of a back muscle group, a leg muscle group, and an abdominal muscle group without assistance of another person, comprising: (a) a rigid modular frame comprising a main frame portion and a detachable base portion, said rigid modular frame having a user application side and a push anchor side; (b) a pivotable panel assembly comprising: (i) a riser bar having a distal end and a free end; (ii) a riser bar lifter attached vertically between a center of said push anchor side of said rigid modular frame and said distal end of said riser bar configured to raise said distal end of said riser bar vertically above said modular rigid frame; (iii) a riser bar lifter attached vertically between a center of said push anchor side of said rigid modular frame and said distal end of said riser bar configured to raise said riser bar's said distal end vertically above said modular rigid frame; and (iii) a plurality of padded arms extending orthogonally from said riser bar and configured to engage a body of said user, wherein said distal end of said riser bar is pivotally mounted to said user application side of said rigid modular frame, and said free end is operatively connected to a power actuator; (c) said powered actuator comprising a motor and a drive mechanism, said powered actuator configured to adjust a position of said pivotable panel assembly by extending or retracting said free end of said riser bar; (d) a user-operated control device operatively coupled to said powered actuator, said user-operated control device being configured to allow said user to selectively actuate an extension or a retraction of said pivotable panel assembly during use; and (e) said stretching apparatus being configurable in at least two operational modes, including: (i) a first mode in which said pivotable panel assembly is positioned to contact and stretch a leg or a plurality of lower body muscles of said user; and (ii) a second mode in which said pivotable panel assembly is positioned to contact and stretch a back or a plurality of abdominal muscles of said user; wherein said stretching apparatus is operable entirely by said user without external assistance. The riser bar lifter lifts the riser bar vertically off of the surface of the base between 5 centimeters and 50 centimeters, with a preferred embodiment at about 15 to 20 centimeters. The vertical lift of the riser bar is what enables stretching of a single leg.

In an alternate embodiment of the present invention there is a stretching apparatus wherein said plurality of padded arms comprises two foam-filled arms or gel-filled arms positioned laterally with respect to one another and configured to distribute force symmetrically across said body of said user during stretching.

In an alternate embodiment of the present invention there is a stretching apparatus wherein said powered actuator is motor-driven and said user-operated control device comprises a handheld remote control or an integrated control panel with directional input for real-time adjustment of a stretch angle.

In an alternate embodiment of the present invention there is a stretching apparatus wherein said detachable base portion is configured to detach without tools and includes stabilizing feet or mounts to ensure operational stability during stretching.

In an alternate embodiment of the present invention there is a stretching apparatus further comprising a rectangular extension frame pivotably connected to said main frame portion, said rectangular extension frame being swingable in the same plane as said pivotable panel assembly to increase a range of motion or to accommodate additional muscle groups.

In an alternate embodiment of the present invention there is a stretching apparatus wherein said pivotable panel assembly is operable through an angular travel range from at least zero degrees to ninety degrees to accommodate different user postures and flexibility levels.

In an alternate embodiment of the present invention there is a stretching apparatus wherein said user-operated control device comprises a programmable interface configured to allow said user to set one or more of a target angle, a stretch duration, or a preconfigured sequence of stretches.

In an alternate embodiment of the present invention there is a stretching apparatus wherein said pivotable panel assembly is adapted to support stretching in at least one of a standing orientation, a seated orientation, and a supine orientation.

In an alternate embodiment of the present invention there is a stretching apparatus wherein said stretching apparatus further comprises a position-locking mechanism configured to maintain said pivotable panel assembly at a selected angular position during a static stretch or an isometric stretch.

In an alternate embodiment of the present invention there is a stretching apparatus wherein said stretching apparatus includes transport wheels and is dimensioned and weighted to allow for both home and clinical use.

The present invention offers a number of expanded advantages over traditional stretching systems, both in functionality and versatility. A primary advantage is the apparatus's capacity to provide fully autonomous stretching, eliminating the need for a partner or therapist. This makes the device especially suitable for home-based therapy, self-managed rehabilitation, and independent training programs.

The integration of a powered actuator and user-operated control interface introduces a new level of precision and user customization. Unlike manual stretching machines that rely on user-generated force or simple mechanical cranks, the present invention allows the user to fine-tune the angle, duration, and sequence of each stretch. This results in safer, more effective routines that can be adjusted in real time to suit the user's condition, flexibility, and comfort level.

The pivotable panel assembly with orthogonally extending padded arms provides ergonomic engagement with the user's body. Whether targeting the hamstrings, lumbar region, hip flexors, or abdominal wall, the design ensures that force is applied evenly across the body's contact points. The cushioning materials reduce discomfort and prevent concentrated pressure, which is especially beneficial for users recovering from injury or managing chronic pain.

The modular frame and detachable base offer practical benefits not found in conventional machines. These features enable easy transport, storage, and reconfiguration of the apparatus for use in different settings—ranging from physical therapy clinics and athletic training rooms to home exercise environments. Clinics and users with limited space particularly benefit from the ability to disassemble and stow the unit when not in use.

Another advantage of the present invention is its adaptability to various user profiles. The frame can be manufactured in adjustable or size-specific models to accommodate individuals of different heights, weights, and therapeutic needs. In addition, optional programmable controllers and app integration allow healthcare providers or fitness professionals to prescribe custom routines for individual users.

The stretching apparatus also supports multiple stretching modes through user repositioning and panel angle adjustments. A single device can be used to perform forward bends, back extensions, side stretches, and static holds, making it a multifunctional asset in any training or recovery program.

From a clinical perspective, the device supports measurable and repeatable outcomes, which are essential for tracking patient progress. Angle sensors, time settings, and sequence logs can provide valuable data to practitioners monitoring rehabilitation or athletic conditioning over time.

Overall, the present invention combines safety, control, comfort, and adaptability in a single apparatus. Its thoughtful integration of mechanical design, powered adjustability, and ergonomic support elevates it beyond the capabilities of conventional stretch machines, filling a long-standing gap in the field of self-directed flexibility and recovery training.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A stretching apparatus for enabling a user to independently stretch at least one of a back muscle group, a leg muscle group, and an abdominal muscle group without assistance of another person, comprising:

(a) a rigid modular frame comprising a main frame portion and a detachable base portion, said rigid modular frame having a user application side and a push anchor side;

(b) a pivotable panel assembly comprising:

(i) a riser bar having a distal end and a free end;

(ii) a riser bar lifter extending vertically between a center gap of said push anchor side of said rigid modular frame and said distal end of said riser bar configured to raise said distal end of said riser bar such that the pivotable panel assembly pivots about a point vertically above said modular rigid frame; and (iii) a plurality of padded arms extending orthogonally from said riser bar and configured to engage a body of said user, wherein said distal end of said riser bar is pivotally mounted to said user application side of said rigid modular frame, and said free end is operatively connected to a powered actuator; said powered actuator comprising a motor and a drive mechanism, said powered actuator configured to adjust a position of said pivotable panel assembly by extending or retracting said free end of said riser bar;

(c) a user-operated control device operatively coupled to said powered actuator, said user-operated control device being configured to allow said user to selectively actuate an extension or a retraction of said pivotable panel assembly during use; and (d) said stretching apparatus being configurable in at least two operational modes, including:

(i) a first mode in which said pivotable panel assembly is positioned to contract and stretch a leg or a plurality of lower body muscles of said user; and (ii) a second mode in which said pivotable panel assembly is positioned to contract and stretch a back or a plurality of abdominal muscles of said user;

wherein said stretching apparatus is operable entirely by said user without external assistance.

2. The apparatus of claim 1, wherein said plurality of padded arms comprises two foam-filled arms or gel-filled arms positioned laterally with respect to one another and configured to distribute force symmetrically across said body of said user during stretching.

3. The apparatus of claim 1, wherein said powered actuator is motor-driven and said user-operated control device comprises a handheld remote control or an integrated control panel with directional input for real-time adjustment of a stretch angle.

4. The apparatus of claim 1, wherein said detachable base portion is configured to detach without tools and includes stabilizing feet or mounts to ensure operational stability during stretching.

5. The apparatus of claim 1, further comprising a rectangular extension frame pivotably connected to said main frame portion, said rectangular extension frame being swingable in the same plane as said pivotable panel assembly to increase a range of motion or to accommodate additional muscle groups.

6. The apparatus of claim 1, wherein said pivotable panel assembly is operable through an angular travel range of at least zero degrees to ninety degrees to accommodate different user postures and flexibility levels.

7. The apparatus of claim 1, wherein said user-operated control device comprises a programmable interface configured to allow said user to set one or more of a target angle, a stretch duration, or a preconfigured sequence of stretches.

8. The apparatus of claim 1, wherein said pivotable panel assembly is adapted to support stretching in at least one of a standing orientation, a seated orientation, and a supine orientation.

9. The apparatus of claim 1, wherein said stretching apparatus further comprises a position-locking mechanism configured to maintain said pivotable panel assembly at a selected angular position during a static stretch or an isometric stretch.

10. The apparatus of claim 1, wherein said stretching apparatus includes transport wheels and is dimensioned and weighted to allow for both home and clinical use.

* * * * *